(12) United States Patent
Limatoc

(10) Patent No.: US 10,968,940 B2
(45) Date of Patent: Apr. 6, 2021

(54) HIGH TORQUE BOLT

(71) Applicant: CRUSHLOCK, INC., Chuluota, FL (US)

(72) Inventor: Arnold R. Limatoc, Aiea, HI (US)

(73) Assignee: CRUSHLOCK, INC., Chuluota, FL (US)

( * ) Notice: Subject to any disclaimer, the term of this patent is extended or adjusted under 35 U.S.C. 154(b) by 86 days.

(21) Appl. No.: 16/392,379

(22) Filed: Apr. 23, 2019

(65) Prior Publication Data

US 2020/0088228 A1   Mar. 19, 2020

Related U.S. Application Data

(63) Continuation of application No. 15/416,358, filed on Jan. 26, 2017, now Pat. No. 10,309,439.

(51) Int. Cl.
| | | |
|---|---|---|
| *F16B 31/04* | (2006.01) | |
| *B21D 53/00* | (2006.01) | |
| *F16B 39/14* | (2006.01) | |
| *F16B 39/284* | (2006.01) | |
| *F16B 39/26* | (2006.01) | |
| *B21D 53/24* | (2006.01) | |

(52) U.S. Cl.
CPC ............. *F16B 31/04* (2013.01); *B21D 53/00* (2013.01); *B21D 53/24* (2013.01); *F16B 39/14* (2013.01); *F16B 39/26* (2013.01); *F16B 39/284* (2013.01); *Y10T 29/4995* (2015.01); *Y10T 29/49948* (2015.01); *Y10T 29/49952* (2015.01); *Y10T 29/49954* (2015.01); *Y10T 29/49963* (2015.01); *Y10T 29/49966* (2015.01)

(58) Field of Classification Search
CPC ......... B21D 53/00; B21D 53/24; F16B 31/04; F16B 39/14; F16B 39/26; F16B 39/284; Y10T 29/49948; Y10T 29/4995; Y10T 29/49952; Y10T 29/49954; Y10T 29/49963; Y10T 29/49966
See application file for complete search history.

(56) References Cited

U.S. PATENT DOCUMENTS

| | | |
|---|---|---|
| 259,552 A | 6/1882 | Kingsley |
| 915,830 A | 3/1909 | Craven |
| (Continued) | | |

FOREIGN PATENT DOCUMENTS

| | | |
|---|---|---|
| GB | 870946 A | 6/1961 |
| GB | 2287764 A | 9/1995 |
| JP | 2005-069254 A | 2/2005 |

OTHER PUBLICATIONS

U.S. Patent and Trademark Office, International Search Report and Written Opinion of International Searching Authority for PCT/US16/44292, dated Oct. 28, 2016 (14 pages).

(Continued)

*Primary Examiner* — Jermie E Cozart
(74) *Attorney, Agent, or Firm* — Nixon Peabody LLP

(57) ABSTRACT

A bolt includes a main-bolt head, a threaded shaft, and a deformable-bolt head component. The main-bolt head has a recess. The threaded shaft extends from the main-bolt head. The threaded shaft has an external thread wrapped therearound. The deformable-bolt head component has an outer flange and an interior threaded bore. The outer flange of the deformable-bolt head component is coupled to the main-bolt head such that a relief space is formed between the deformable-bolt head component and the recess.

10 Claims, 7 Drawing Sheets

(56) References Cited

U.S. PATENT DOCUMENTS

| | | | |
|---|---|---|---|
| 1,049,765 | A | 1/1913 | Reed |
| 1,052,601 | A | 2/1913 | Luyties |
| 1,406,423 | A | 2/1922 | Smith |
| 1,838,605 | A | 12/1931 | Youlten |
| 2,258,181 | A | 10/1941 | Hinds |
| 2,286,336 | A | 6/1942 | Brooke |
| 2,318,398 | A | 5/1943 | Hungerford |
| 2,320,785 | A | 6/1943 | Luce |
| 2,374,241 | A | 4/1945 | Simmonds |
| 2,375,325 | A | 5/1945 | Robertson |
| 2,529,093 | A | 7/1945 | Luce |
| 2,381,110 | A | 8/1945 | Chandler |
| 2,389,377 | A | 11/1945 | Manning |
| 2,390,726 | A | 12/1945 | Mitchell |
| 2,564,645 | A | 8/1951 | Johnson |
| 2,927,495 | A | 3/1960 | Barwood |
| 3,129,742 | A | 4/1964 | Faroni |
| 3,491,630 | A | 1/1970 | Mielke |
| 3,522,830 | A | 8/1970 | Blizard |
| 2,222,460 | A | 11/1970 | Crowley |
| 3,606,357 | A | 9/1971 | Yonkers |
| 3,670,618 | A | 6/1972 | Jellison |
| 3,672,334 | A | 6/1972 | Scheppele |
| 3,757,630 | A | 9/1973 | Dahl |
| 3,882,752 | A | 5/1975 | Gutshall |
| 4,019,550 | A | 4/1977 | DeHaitre |
| 4,206,060 | A | 6/1980 | Yamamoto |
| 4,749,321 | A | 6/1988 | Knohl |
| 5,156,509 | A | 10/1992 | Wu |
| 5,454,675 | A | 10/1995 | DeHaitre |
| 5,622,464 | A | 4/1997 | Dill |
| 5,927,918 | A | 7/1999 | Burger |
| 6,132,153 | A | 10/2000 | LeVey |
| 6,881,019 | B2 | 4/2005 | Wolf |
| 8,087,863 | B2 | 1/2012 | Flaig |
| 8,888,426 | B2 | 11/2014 | Diehl |
| 2010/0068004 | A1 | 3/2010 | Mair |
| 2014/0017028 | A1 | 1/2014 | McKinlay |
| 2014/0286727 | A1 | 9/2014 | Limatoc |

OTHER PUBLICATIONS

U.S. Patent and Trademark Office, International Search Report and Written Opinion of International Searching Authority for PCT/US14/041272, dated Jun. 6, 2014 (10 pages).

International Searching Authority, International Search Report and Written Opinion in International Application No. PCT/US18/13142, dated Mar. 28, 2018 (10 pages).

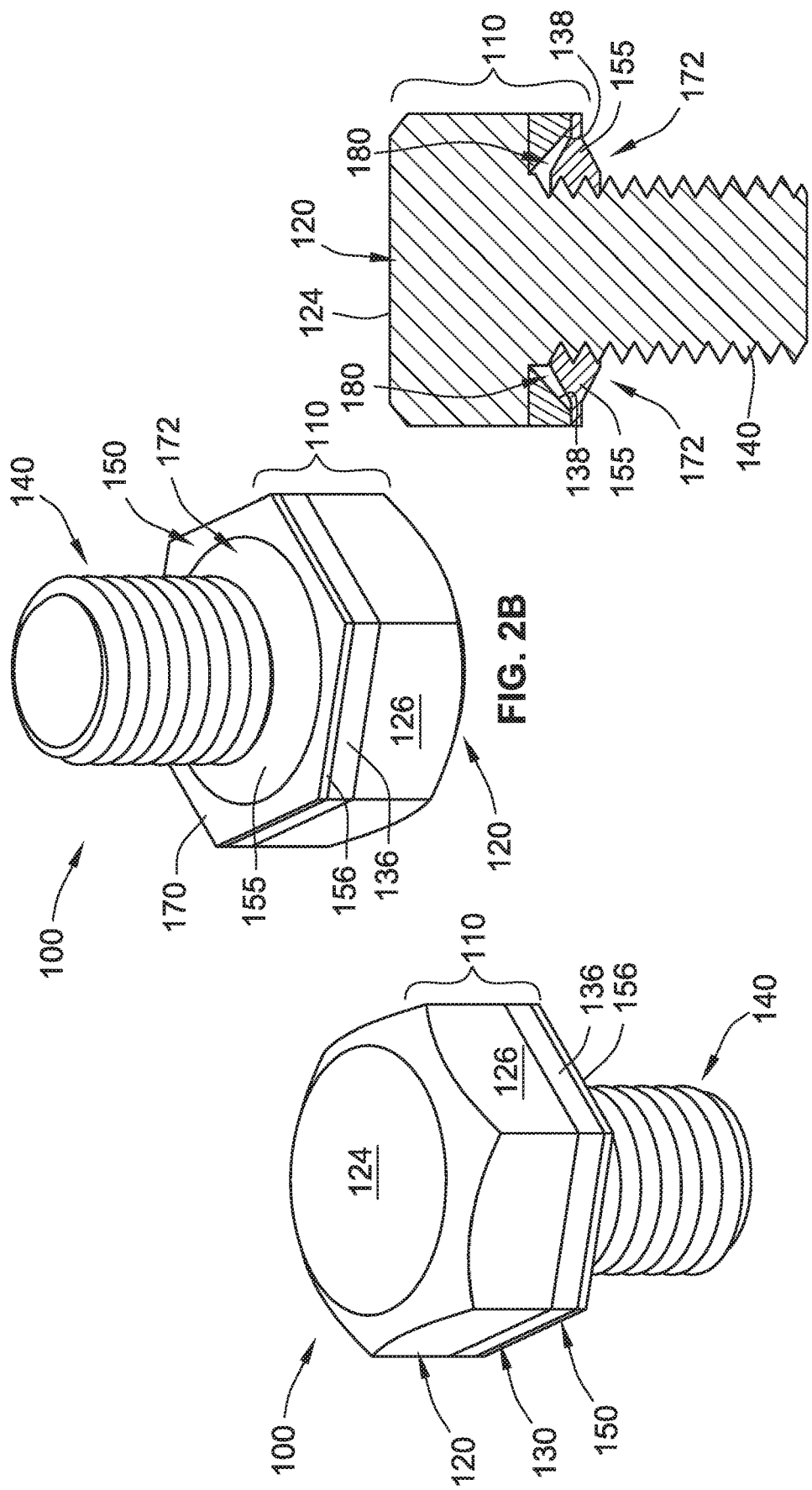

HIGH TORQUE BOLT

CROSS-REFERENCE TO RELATED APPLICATIONS

This application is a continuation of U.S. patent application Ser. No. 15/416,358, filed Jan. 26, 2017, which is hereby incorporated by reference herein in its entirety.

TECHNICAL FIELD

The present disclosure relates generally to bolts and more specifically to high torque bolts with reinforced heads.

BACKGROUND

In many applications, it is desirable to have a threaded nut fastened on a threaded bolt that can withstand high torques and correspondingly high preloads without the bolt/nut fastener failing (e.g., shearing or popping off of the bolt head). Conventionally, a nut is fastened on a threaded shaft of the bolt, which applies a preload force to a joint. The joint typically includes two items (e.g., plates) being secured or bolted together by the bolt/nut fastener. The preload force causes the bolt shaft to stretch along its central axis and also holds and/or bolts items together (e.g., by way of the bolt head and nut exerting opposing clamp forces on the items). However, the conventional use of nut and bolt fasteners concentrates the preload force at the point where the shaft meets the head of the bolt, which can be the weakest point of the bolt and most susceptible of failing. The present disclosure is directed to solving these and other problems by providing a high torque bolt with an improved head-shaft joint that permits the bolt/nut fastener to be torqued to apply relatively higher preload forces.

BRIEF SUMMARY

According to some implementations of the present disclosure, a bolt includes a main-bolt head, a threaded shaft, and a deformable-bolt head component. The main-bolt head has a recess. The threaded shaft extends from the main-bolt head. The threaded shaft has an external thread wrapped therearound. The deformable-bolt head component has an outer flange and an interior threaded bore. The outer flange of the deformable-bolt head component is fixed to the main-bolt head such that a relief space is formed between the deformable-bolt head component and the recess.

According to some implementations of the present disclosure, a bolt includes a main-bolt head, a threaded shaft, and a deformable-bolt head component. The main-bolt head has (i) a front surface, (ii) an opposing back surface, (iii) an outer surface configured to be engaged by a tool to rotate the bolt about a central axis of the bolt shaft thereby causing the main-bolt head to move axially in a first direction towards an object, and (iv) a recess in the front surface extending into the main-bolt head towards the opposing back surface. The threaded shaft extends from the main-bolt head at a head-shaft joint. The threaded shaft has an external thread wrapped therearound. The deformable-bolt head component has (i) a front surface configured to engage the object thereby limiting axial movement of the deformable-bolt head component, (ii) an opposing back surface, (iii) an outer surface, (iv) an interior threaded bore forming at least a portion of a turn of an internal thread therein, and (v) an outer flange. The interior threaded bore of the deformable-bolt head component is threadingly coupled to the threaded shaft. The outer flange of the deformable-bolt head component is attached to the front surface of the main-bolt head such that a relief space is formed between the deformable-bolt head component and the recess. The relief space provides an area for the deformable-bolt head component to deform into during installation of the bolt.

According to some implementations of the present disclosure, a method of making a bolt includes providing a main-bolt head with a threaded shaft extending therefrom. The main-bolt head has a recess. A deformable-bolt head component having an outer flange and an interior threaded bore is provided. The deformable-bolt head component is threaded onto the threaded shaft such that a portion of the deformable-bolt head component is positioned within the recess of the main-bolt head and until the outer flange engages a front surface of the main-bolt head, thereby forming a relief space between the deformable-bolt head component and the recess.

According to some implementations of the present disclosure, a method of securing a bolt to an object with a nut is provided. The bolt has a threaded shaft extending from a main-bolt head and a deformable-bolt head component coupled to the main-bolt head such that a relief space is formed between the main-bolt head and the deformable-bolt head component. The method includes positioning the threaded shaft through an opening in the object such that a portion of the threaded shaft protrudes from the opening. The nut is threaded onto the portion of the threaded bolt shaft protruding from the opening by rotating the nut in a first rotational direction, thereby causing the nut to move axially in a first direction towards a first surface of the object. A front surface of the nut is caused to abut the first surface of the object and a front surface of the deformable-bolt head component is caused to abut a second opposing surface of the object by: (i) continuing to thread the nut onto the portion of the threaded bolt shaft, (ii) rotating the bolt in a second opposing rotational direction, or (iii) a combination of (i) and (ii). With the front surface of the nut abutting the first surface of the object and with the front surface of the deformable-bolt head component abutting the second opposing surface of the object, (a) a first rotational torque is applied in the first rotational direction to the nut, (b) a second rotational torque is applied in the second rotational direction to the bolt, or (c) both (a) and (b). The application of the first rotational torque, the application of the second rotational torque, or the application of both the first and the second rotational torques causes: (x) the main-bolt head to move axially in a second direction that is opposite the first direction, and (y) the deformable-bolt head component to deform, thereby entering into the relief space formed between the deformable-bolt head component and the main-bolt head.

According to some implementations of the present disclosure, a method of making a bolt having a reinforced head includes providing a main-bolt head with a threaded shaft extending therefrom. An angled collar is positioned about the threaded shaft such that the angled collar engages the main-bolt head. The angled collar has an angled inner surface. The angled collar is fixed to the main-bolt head, thereby forming a recess of the reinforced head. A deformable-bolt head component is threaded onto the threaded shaft (i) such that a portion of the deformable-bolt head component is positioned within the recess of the reinforced head and (ii) until an outer flange of the deformable-bolt head component engages a front surface of the angled collar, thereby forming a relief space between the deformable-bolt head component and the recess.

According to some implementations of the present disclosure, a bolt having a reinforced head includes a main-bolt head, an angled collar, a threaded shaft, and a deformable-bolt head component. The angled collar has an angled inner surface. The angled collar is fixed to the main-bolt head such that the angled collar forms a recess of the reinforced head. The threaded shaft extends from the main-bolt head and through the angled collar. The threaded shaft has an external thread wrapped therearound. The deformable-bolt head component has an outer flange and an interior threaded bore. The outer flange of the deformable-bolt head component is fixed to the angled collar such that a relief space of the reinforced head is formed between the deformable-bolt head component and the recess.

According to some implementations of the present disclosure, a bolt having a reinforced head includes a main-bolt head, a collar, a threaded shaft, and a deformable-bolt head component. The collar is fixed to the main-bolt head such that the collar forms a recess of the reinforced head. The threaded shaft extends from the main-bolt head and through the collar. The threaded shaft has an external thread wrapped therearound. The deformable-bolt head component has an outer flange and an interior threaded bore. The outer flange of the deformable-bolt head component is coupled to the collar such that a relief space of the reinforced head is formed between the deformable-bolt head component and the recess.

Other objects, features, and advantages of the present disclosure will be explained in the following detailed description having reference to the appended drawings.

BRIEF DESCRIPTION OF DRAWINGS

FIG. 2A is an assembled top perspective view of the bolt of FIG. 1A;

FIG. 2B is an assembled bottom perspective view of the bolt of FIG. 2A;

FIG. 2C is an assembled front cross-sectional view of the bolt of FIG. 2A;

Figure 1B:
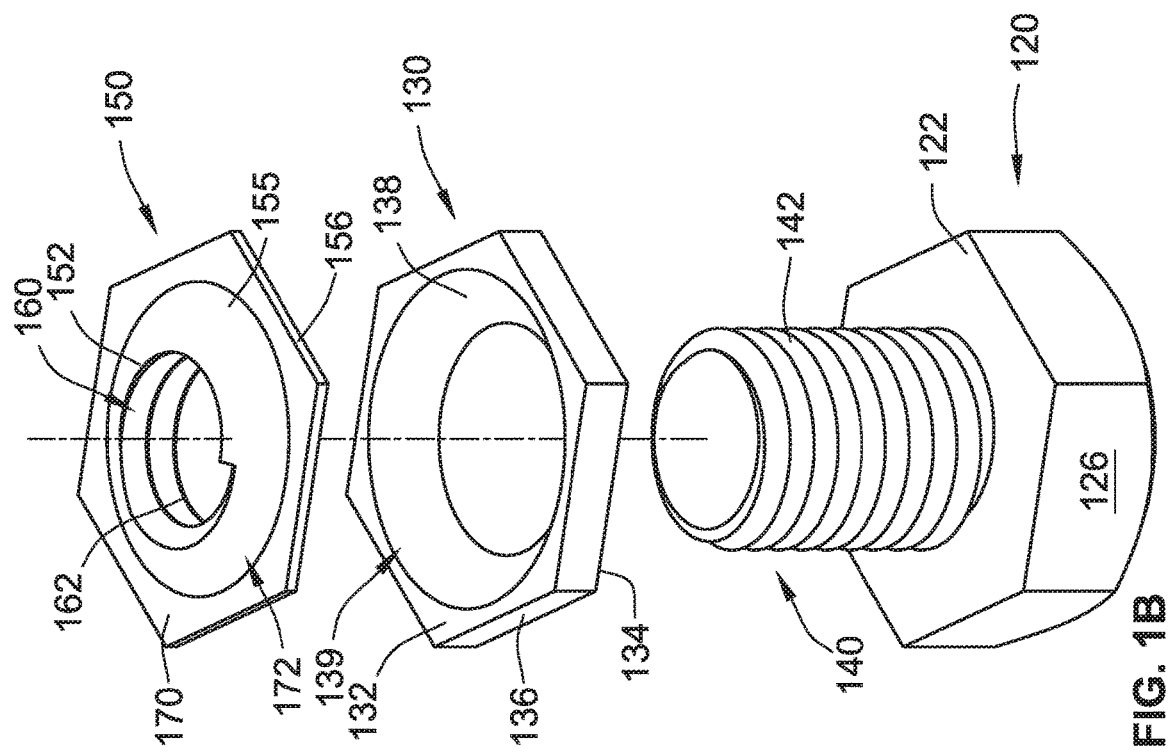
FIG. 1B is an exploded bottom perspective view of the bolt of FIG. 1A.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure is to cover all modifications, equivalents, and alternatives falling within the spirit and scope of the present disclosure as defined by the appended claims.

DETAILED DESCRIPTION

Figure 1A:
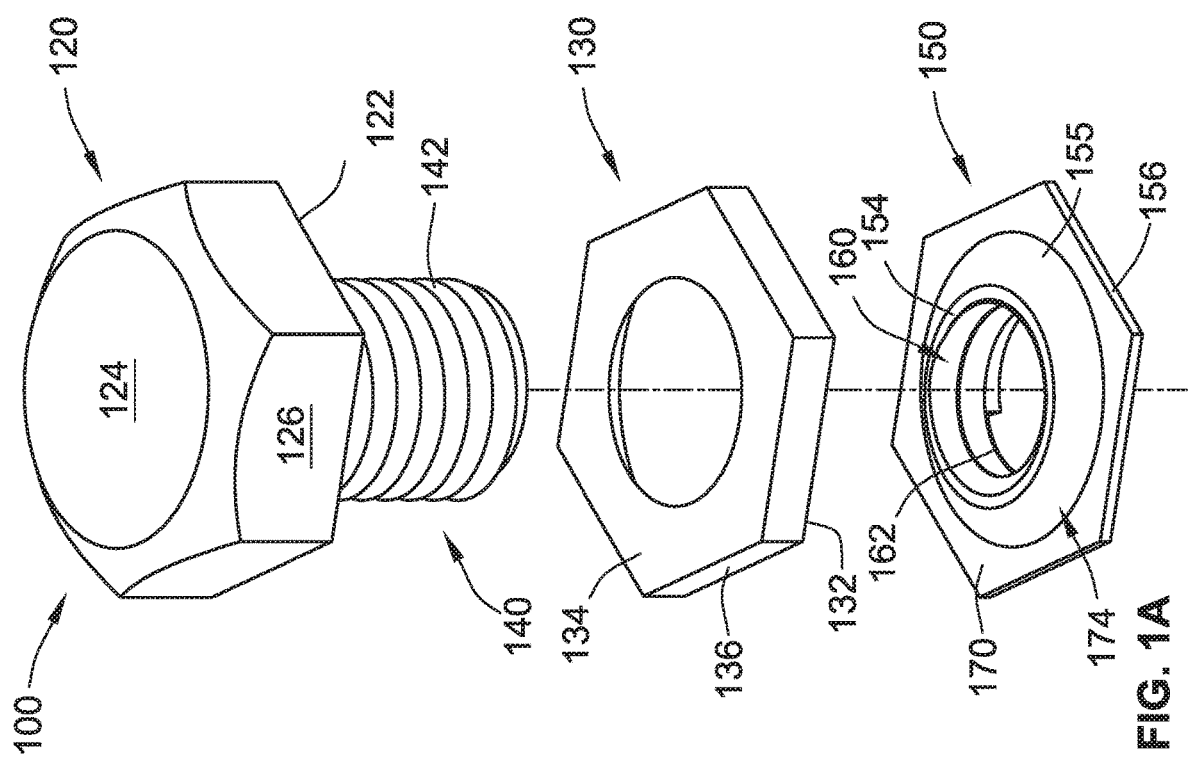
FIG. 1A is an exploded top perspective view of a bolt according to some implementations of the present disclosure.
Figure 1C:
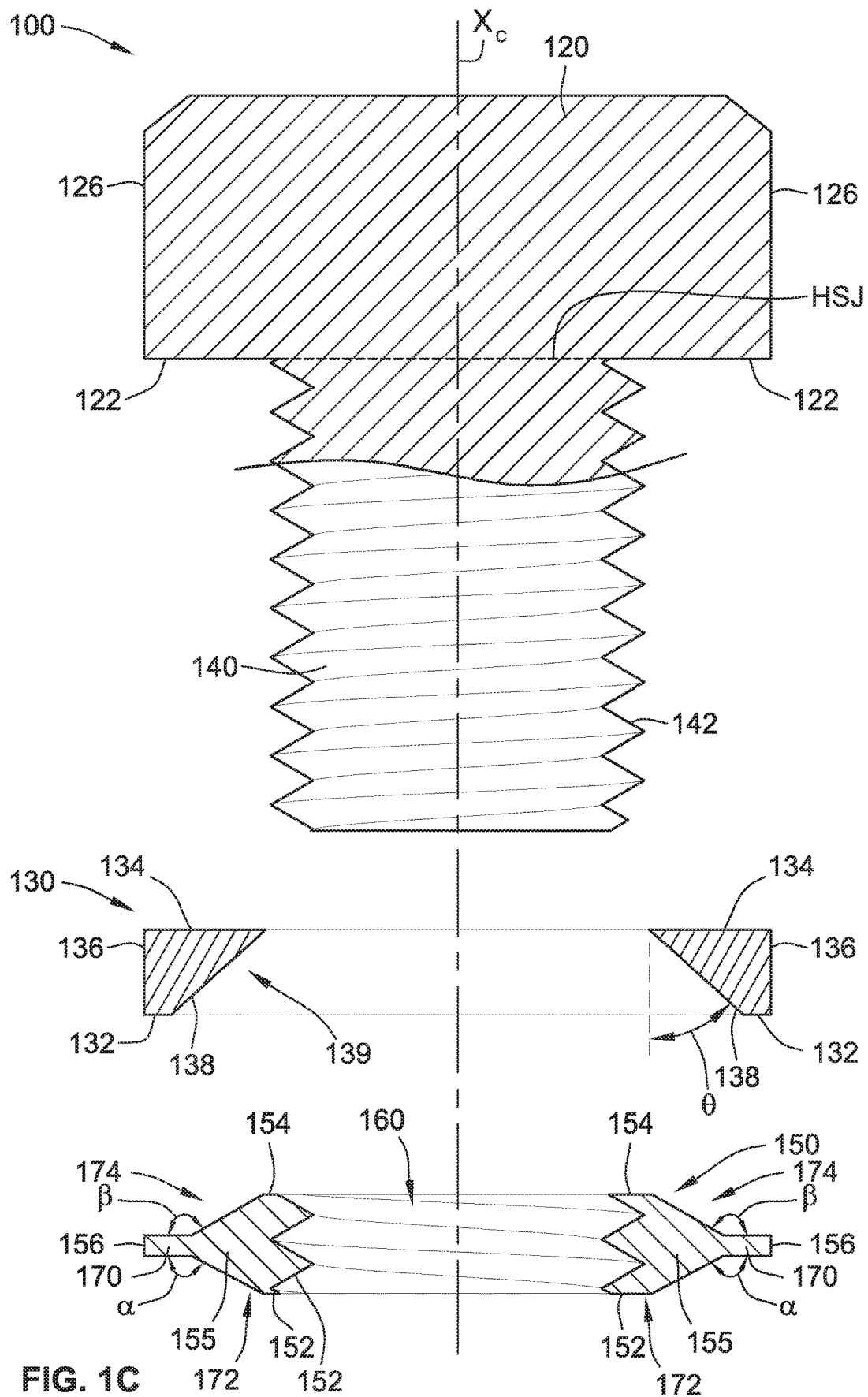
FIG. 1C is an exploded front cross-sectional view of the bolt of FIG. 1A.

Referring generally to FIGS. 1A-1C, a bolt 100 (e.g., a one-piece self-reinforcing bolt) includes a main-bolt head 120, an angled collar 130, a threaded shaft 140 extending from the main-bolt head 120, and a deformable-bolt head component 150. As shown in FIGS. 1A-1C, the bolt 100 is exploded or in a pre-assembled configuration where the angled collar 130 and the deformable-bolt head component 150 are separated from the main-bolt head 120 and the threaded shaft 140. As shown in FIGS. 2A-2C, the bolt 100 is in an assembled configuration where the angled collar 130 and the deformable-bolt head component 150 are both fixed/attached to the main-bolt head 120, thereby forming a reinforced head 110 of the bolt 100.

The bolt 100 can be made from one or more materials, such as, for example, brass, steel, stainless steel (e.g., type 304 stainless steel, grade 2, super alloy), titanium, plastic, nylon, etc. The main-bolt head 120, the angled collar 130, the threaded shaft 140, and the deformable-bolt head component 150 are made from the same material (e.g., steel). Alternatively, the main-bolt head 120, the angled collar 130, and the threaded shaft 140 are made from a first material that has a first set of properties and the deformable-bolt head component 150 is made from a second material that has a second set of properties that is different than the first set of properties. For example, in such alternatives, the second material may be relatively more ductile than the first material.

According to some implementations of the present disclosure, a height of the angled collar 130 can range from 10% of to 80% of a standard (e.g., ASTM or SAE) bolt-head height; a height of the main-bolt head 120 plus the height of the angled collar 130 can range from 10% of to 50 times a standard (e.g., ASTM or SAE) bolt-head height; and a height of the deformable-bolt head component 150 can range from 0.5 turns of a thread to 95% of the height of the main-bolt head 120. The sizes of the main-bolt head 120 and the deformable-bolt head component 150 can be selected for a specific application (e.g., based on the desired installation torque).

In some implementations, the height of the deformable-bolt head component 150 equals the height of two internal threads 162 of the interior threaded bore 160 of the deformable-bolt head component 150. In some such implementations, the height of the angled collar 130 is the same as, or about the same as, the height of the deformable-bolt head component 150. In some such implementations, the height of an outer flange 170 (FIG. 1A) is between about twenty percent and about twenty-five percent of the height of the angled collar 130.

The main-bolt head 120 has a front surface 122 (FIGS. 1A-1C), an opposing back surface 124 (best shown in FIGS. 1A and 2A), and an outer surface 126 (FIGS. 1A, 1B, 2A, and 2B). The outer surface 126 of the main-bolt head 120 is configured to be engaged by a tool (not shown) in some implementations of the present disclosure, such as, for example, a torque wrench, to rotate and/or hold the bolt 100 in relation to a nut 200 (shown in FIGS. 3A-3D) causing the main-bolt head 120 to move axially in a direction of arrow A towards one or more objects 300*a*, 300*b* (e.g., a plate) to be secured (e.g., bolted together between the reinforced head 110 of the bolt 100 and the nut 200). As best shown in FIGS. 1A and 2A, the outer surface 126 of the main-bolt head 120 is shaped such that the main-bolt head 120 has a generally hexagonal outer cross-section, but other shapes for the outer surface 126 are contemplated (e.g., square, oval, triangle, rectangle, polygon, etc.) such that the tool can engage the bolt 100 in a non-rotational fashion (e.g., the tool can cause the bolt 100 to rotate relative to the nut 200 and/or the tool can hold the bolt 100 and prevent the bolt 100 from rotating relative to the nut 200).

In some implementations, the main-bolt head 120 is not engaged by a tool during installation. Rather, in such alternative implementations, the nut 200 is engaged by the tool such that the nut is rotated relative to the bolt 100. Further, in some implementations, the main-bolt head 120 is engaged by a first tool and the nut 200 is engaged by a second tool such that the bolt 100 and/or the nut 200 are rotated relative to each other. In such implementations, it is understood that the bolt 100 and/or nut 200 can be rotated or held (e.g., prevented from being rotated) such that relative rotation occurs causing the bolt 100 and the nut 200 to be fastened together.

The angled collar 130 (FIGS. 1A-1C) has a front surface 132 (FIGS. 1B and 1C), an opposing back surface 134 (best shown in FIG. 1A), an outer surface 136 (FIGS. 1A, 1B, 2A, and 2B), and an angled inner surface 138 (FIGS. 1B and 1C). The outer surface 136 of the angled collar 130 is configured to be engaged by the tool (not shown), in the same fashion as the outer surface 126. As best shown in FIGS. 1A and 1B, the outer surface 136 of the angled collar 130 is shaped such that the angled collar 130 has a generally hexagonal outer cross-section, but other shapes for the outer surface 136 are contemplated such that the tool can engage the bolt 100 in a non-rotational fashion (e.g., the tool can cause the bolt 100 to rotate relative to the nut 200, vice versa). As best shown in FIGS. 2A-2C, the entirety of the outer surface 136 of the angled collar 130 is co-planar with the entirety of the outer surface 126 of the main-bolt head 120 (i.e., about the entire circumference of the reinforced head 110).

The angled inner surface 138 of the collar 130 extends from the front surface 132 of the angled collar 130 towards the opposing back surface 134 of the angled collar 130. Further, when the angled collar 130 is fixed/attached to the front surface 122 of the main-bolt head 120, the angled inner surface 138 of the angled collar 130 forms an annular inwardly tapered recess 139 of the reinforced head 110.

As best shown in FIG. 1C, the angled inner surface 138 and thus the inwardly tapered recess 139 is tapered with respect to vertical or a central axis $X_c$ of the bolt 100 at an angle, $\theta$, of about 45 degrees. Alternatively, the angled inner surface 138 and the inwardly tapered recess 139 can tapered with respect to vertical or the central axis $X_c$ of the bolt 100 at an angle, $\theta$, which is between about 0 degrees and about 90 degrees. More preferably, the angled inner surface 138 and the inwardly tapered recess 139 are tapered with respect to vertical or the central axis $X_c$ of the bolt 100 at the angle, $\theta$, which is between about 30 degrees and about 75 degrees.

While the angled collar 130 and the main-bolt head 120 are shown as being two separate and distinct components of the bolt 100, it is contemplated that the angled collar 130 and main-bolt head 120 can be one monolithic part. In such implementations, the inwardly tapered recess 139 of the reinforced head 110 can be referred to herein as the recess of the main-bolt head 120.

The angled collar 130 has a height that is about twenty-five percent of the height of a standard bolt head (e.g., between about 0.05 inches and about 0.25 inches, about 0.05 inches, about 0.07 inches, about 0.08 inches, about 0.09 inches, about 0.1 inches, about 0.25 inches, etc.). In some implementations, the angled collar 130 has a height that is between about one percent and about twenty-five percent of a total height of the main-bolt head 120 plus the angled collar 130 (e.g., about one percent, about two percent, about five percent, about ten percent, about fifteen percent, about twenty percent, about twenty-five percent, etc.).

While the angled collar 130 is shown and described herein as having the angled inner surface 138 with a specific shape (e.g., a straight taper/angle) that forms the inwardly tapered recess 139 with the shape as shown in the figures (e.g., a conically shaped recess), in some alternative implementations, the inner surface of the collar can have a variety of other shapes and configurations such that the recess also has a different shape and configuration. For example, the inner surface can have a concave configuration (e.g., a scoop, a curved angle, a simple curve, etc., or any combination thereof). In some such implementations, the concave configuration of the inner surface of the collar provides relatively more space into which the deformable-bolt head component 150 can deform/flow. For another example, the inner surface can have a convex configuration (e.g., a bulge, an outwardly curved angle, a protrusion, etc., or any combination thereof). In some such implementations, the convex configuration of the inner surface of the collar provides relatively less space into which the deformable-bolt head component 150 can deform/flow. For another example, the inner surface can have any shape/configuration such that a recess is formed to provide some amount of space into which the deformable-bolt head component 150 can deform/flow during installation of the bolt 100.

The threaded shaft 140 is a cylindrical rod with an external thread 142 wrapped therearound. While a certain sized thread having a thread pitch and a thread depth is shown, the external thread 142 can have any pitch and any depth. Further, while a certain length of the threaded shaft 140 is shown, the threaded shaft 140 can have any length (e.g., between about 0.25 inches or shorter and about 100 inches or longer). While the threaded shaft 140 and the main-bolt head 120 are shown as being one monolithic part, the threaded shaft 140 can be described as being attached or coupled to the main-bolt head 120 at or along a head-shaft joint, which is illustrated in FIG. 1C as imaginary/dashed line HSJ.

The deformable-bolt head component 150 has a central body portion 155 (FIGS. 1A-1C) and the outer flange 170 (FIGS. 1A-1C). The central body portion 155 defines an interior threaded bore 160 (FIGS. 1A-1C) of the deformable-bolt head component 150. The deformable-bolt head component 150 has a front surface 152 (FIGS. 1B and 1C), an opposing back surface 154 (FIGS. 1A and 1C), an outer surface 156 (FIGS. 1A-1C), an inclined front face 172 (FIGS. 1B and 1C), and an inclined rear face 174 (FIGS. 1A and 1C). The central body portion 155 is generally defined as the portion of the deformable-bolt head component 150 that is between the outer flange 170 and the interior threaded bore 160 and between the inclined front face 172 and the inclined rear face 174. As described in further detail below, the central body portion 155 deforms and/or plasticizes during installation of the bolt 100. According to some implementations of the present disclosure, a lubricant (e.g., oils, WD40, Teflon, etc.) can be used between the bolt 100 (e.g., on the deformable-bolt head component 150) and the objects 300a, 300b (see FIGS. 3A-3D) to be bolted together to enable and/or aid in facilitating the central body portion 155 to rotate relative to the objects 300a, 300b and increase the clamping force and facilitate the deformation or plasticization of the central body portion 155 in the inwardly tapered recess 139 of the reinforced head 110.

In some implementations, the deformable-bolt head component 150 has a general "flying saucer" shape that is formed symmetrically about a transverse plane. As best shown in FIG. 1C, the inclined front face 172 and the inclined rear face 174 are both at angles of α and β, respectively, relative to horizontal and/or relative to the outer flange 170. As shown, the angles α and β are each about one hundred and fifty degrees. Alternatively, in some implementations, the angles α and β can be any angle between about ninety degrees and about one hundred and eighty degrees (e.g., about 90 degrees, about 100 degrees, about 110 degrees, about 120 degrees, about 130 degrees, about 140 degrees, about 150 degrees, about 160 degrees, about 170 degrees, about 180 degrees, etc.). More preferably, each of the angles α and β is between about one hundred degrees and about one hundred and seventy degrees. While the angles α and β are shown as being the same, the angles α and β can be different. For example, the angle α can be about one hundred and thirty degrees and the angle β can be about one hundred and sixty degrees. Any combination of different angles α and β is contemplated. In some alternative implementations, the angles α and β can be any angle between about ninety degrees and about two hundred and seventy degrees.

Alternatively to the deformable-bolt head component 150 having a general "flying saucer" shape formed by the inclined front face 172 and the inclined rear face 174 being at angles α and β between ninety degrees and one hundred and eighty degrees, the deformable-bolt head component 150 can have an inverted central body portion (not shown) that is inverted on the front face and/or inverted on the rear face. In such alternative implementations, the angles α and β are greater than one hundred and eighty degrees. For example, a deformable-bolt head component can have an inverted front face (not shown) and an inverted rear face (not shown) at angles α and β between about one hundred and eighty-one degrees and about two hundred and five degrees. According to some such implementations where the deformable-bolt head component is inverted, the inwardly tapered recess 139 of the reinforced head 110 can be altered from (i) extending from the front surface 132 of the angled collar 130 into the reinforced head 110 and towards the front surface 122 of the main-bolt head 120 to (ii) extending out of the reinforced head 110 away from the front surface 122 of the main-bolt head 120 (e.g., an outwardly tapered recess).

According to some implementations of the present disclosure, the deformable-bolt head component 150 and/or the central body portion 155 has a height that is about one-third the height of a standard bolt head (e.g., between about 0.07 inches and about 0.33 inches, about 0.066 inches, about 0.08 inches, about 0.11 inches, about 0.15 inches, about 0.33 inches, etc.). In some implementations, the height of the central body portion 155 can be in the range from about one-half of the height of a single thread to about 95% of the height of the main-bolt head 120 plus the height of the angled collar 130. In some implementations, the deformable-bolt head component 150 and/or the central body portion 155 has a height that is between about one percent and about ninety-five percent of a total height of the main-bolt head 120 plus the height of the angled collar 130 (e.g., about one percent, about two percent, about five percent, about ten percent, about twenty percent, about twenty-five percent, about thirty percent, about thirty-five percent, about forty percent, about forty-five percent, about ninety-five percent, etc.). More preferably, the deformable-bolt head component 150 and/or the central body portion 155 has a height that is between about five percent and about thirty-five percent of the total height of the main-bolt head 120 plus the height of the angled collar 130. Any combination of different heights for the deformable-bolt head component 150, the main-bolt head 120, and the angled collar 130 is contemplated.

The front surface 152 of the deformable-bolt head component 150 is the forward most surface of the reinforced head 110 of the bolt 100 that is positioned to engage the objects 300a, 300b (see FIGS. 3A-3D) to be bolted together (e.g., between the reinforced head 110 and the nut 200), which limits the axial movement of the deformable-bolt head component 150 during installation of the bolt 100.

The outer surface 156 of the deformable-bolt head component 150 is configured to be engaged by the tool (not shown), in the same fashion as the outer surface 126 of the main-bolt head 120. As best shown in FIGS. 1A and 1B, the outer surface 156 of the deformable-bolt head component 150 is shaped such that the deformable-bolt head component 150 has a generally hexagonal outer cross-section, but other shapes for the outer surface 156 are contemplated such that the tool can engage the bolt 100 in a non-rotational fashion (e.g., the tool can cause the bolt 100 to rotate relative to the nut 200, vice versa).

The interior threaded bore 160 of the deformable-bolt head component 150 forms a plurality of turns of an internal thread 162 therein (FIGS. 1A-1C). As shown, the internal thread 162 of the deformable-bolt head component 150 has the same pitch and depth as the external thread 142 of the threaded shaft 140 such that the deformable-bolt head component 150 can be readily threaded onto (i.e., screwed on) the threaded shaft 140 of the bolt 100 (e.g., during assembly/creation of the bolt 100). As best shown in FIG. 1C, the interior threaded bore 160 forms about two complete turns of the internal thread 162 therein. Alternatively, the interior threaded bore 160 forms between about 0.125 turns and about 200 turns of the internal thread 162 therein. More preferably, the interior threaded bore 160 forms between about 0.5 turns and about 4 turns of the internal thread 162 therein. In some implementations, the interior threaded bore 160 forms less than three complete turns of the internal thread 162 therein. In some implementations, the interior threaded bore 160 forms less than two complete turns of the internal thread 162 therein. In some implementations, the interior threaded bore 160 forms less than one complete turn of the internal thread 162 therein.

The outer flange 170 of the deformable-bolt head component 150 is relatively thinner than the central body portion 155 of the deformable-bolt head component 150 such that the outer flange 170 is able to act as a pivot and/or fulcrum point for the central body portion 155 to deform/plasticize about during installation of the bolt 100 in conjunction with the nut 200 and the objects 300a, 300b. In some implementations, the outer flange 170 of the deformable-bolt head component 150 has a first elastic modulus and the rest of the deformable-bolt head component 150 has a second elastic modulus that is greater than the first elastic modulus. In some implementations, the outer flange 170 has a thickness between about 0.0004 inches and about 12 inches. More preferably, the outer flange 170 has a thickness between about 0.002 inches and about 0.5 inches. In some implementation, the outer flange 170 has a thickness that is between about 10 percent to about 80 percent of a maximum/total height of the deformable-bolt head component 150. More preferably, the outer flange 170 has a thickness that is between about 15 percent to about 30 percent of the maximum/total height of the deformable-bolt head component 150.

As best shown in FIGS. 2A-2C, the outer flange 170 extends outwardly from the central body portion 155 such that the entirety of the outer surface 156 of the deformable-bolt head component 150 is co-planar with the entirety of the outer surface 126 of the main-bolt head 120 and the entirety of the outer surface 136 of the angled collar 130 (i.e., about the entire circumference of the reinforced head 110).

Alternatively, the outer flange 170 extends outwardly from the central body portion 155 such that only a portion of the outer surface 156 of the deformable-bolt head component 150 is co-planar with the outer surface 126 of the main-bolt head 120 and the outer surface 136 of the angled collar 130. For example, if the outer surface 156 has an outer circular cross-section with a diameter equal to a minimum width of the main-bolt head 120, then only tangential portions of the outer surface 156 of the deformable-bolt head component 150 would be co-planar with the outer surface 126 of the main-bolt head 120 and the outer surface 136 of the angled collar 130.

In another alternative implementation, the outer flange 170 extends outwardly such that none of the outer surface 156 of the deformable-bolt head component 150 is co-planar with the outer surface 126 of the main-bolt head 120 and the outer surface 136 of the angled collar 130 (e.g., when a maximum outer diameter of the deformable-bolt head component 150 is less than a minimum outer diameter of the main-bolt head 120). In some such implementations where none of the outer surface 156 is co-planar with the outer surface 126 and the outer surface 136, the tool engaging the bolt 100 during installation would not directly engage the deformable-bolt head component 150. Further, in some such implementations where none of the outer surface 156 is co-planar with the outer surface 126 and the outer surface 136, the outer flange 170 and the front surface 132 of the angled collar 130 form an undercut (not shown).

In a further alternative implementation, at least a portion of the outer flange 170 extends outwardly past the outer surface 126 of the main-bolt head 120 and/or the outer surface 136 of the angled collar 130 (e.g., when a maximum outer diameter of the deformable-bolt head component 150 is greater than a maximum outer diameter of the main-bolt head 120). In some such alternative implementations, a portion of the outer flange 170 forms a flange (not shown) of the reinforced head 110. Such a flange of the reinforced head 110 can have any shaped cross-section, such as, for example, ring, annulus, circular, hexagonal, oval, square, triangular, etc., or any combination thereof. In some such implementations where the at least a portion of the outer flange 170 extends outwardly past the outer surface 126 of the main-bolt head 120 and/or the outer surface 136 of the angled collar 130, the tool engaging the bolt 100 during installation would not engage the deformable-bolt head component 150 in a non-rotational manner, but rather abuts the flange to aid in preventing the tool from sliding and/or popping off of the reinforced head 110 during installation.

To assemble the bolt 100 from its unassembled or exploded state (FIG. 1A-1C) into its assembled state (FIG. 2A-2C), the angled collar 130 is positioned about the threaded shaft 140 such that the opposing back surface 134 of the angled collar 130 abuts/contacts the front surface 122 of the main-bolt head 120. With the angled collar 130 abutting (e.g., touching) the front surface 122, the angled collar 130 is fixed (e.g., welded, glued, soldered, etc.) to the main-bolt head 120, thereby forming the inwardly tapered recess 139 of the reinforced head 110. Then, the deformable-bolt head component 150 is threaded onto the threaded shaft 140 until the outer flange 170 of the deformable-bolt head component 150 abuts the front surface 132 of the angled collar 130. As such, a relief space 180 (FIGS. 2C and 3A) is generally formed between a portion of the deformable-bolt head component 150, a portion of the angled collar 130, and a portion of the threaded shaft 140. With the outer flange 170 abutting (e.g., touching) the front surface 132 of the angled collar 130, the deformable-bolt head component 150 is fixed (e.g., welded, glued, soldered, etc.) to the angled collar 130, thereby completing the reinforced head 110 (e.g., prior to being installed).

Alternatively to the deformable-bolt head component 150 being fixed to the angled collar 130, the outer flange 170 of the deformable-bolt head component 150 is not fixed to the angled collar 130, such that the deformable-bolt head component 150 remains free to rotate about the threaded bolt shaft 140 relative to the angled collar 130 and relative to the main-bolt head 120. In some such implementations, the deformable-bolt head component 150 rotates relative to the angled collar 130 during installation of the bolt 100, but at some point during installation, the deformable-bolt head component 150 stops rotating under the preload pressure and then deforms as described herein.

As best shown in FIG. 2C, the relief space 180 is formed as a generally annular space bounded by (i) the threaded shaft 140, (ii) the angled inner surface 138 of the angled collar 130, and (iii) a portion of the outer flange 170, the inclined rear face 174 (FIG. 1C), and the back surface 154 (FIG. 1C). The relief space 180 provides an area for the deformable-bolt head component 150 to deform into (e.g., elastically flow via plastic deformation) during installation of the bolt 100 in conjunction with the nut 200 and the objects 300a, 300b (as shown in FIGS. 3A-3D). In some implementations, the central body portion 155 of the deformable-bolt head component 150 deforms into (e.g., elastically flow via plastic deformation) the relief space 180. In some implementations, a portion of the outer flange 170 also deforms into (e.g., elastically flow via plastic deformation) the relief space 180.

The outer flange 170 can be permanently and/or non-rotationally attached/fixed to the main-bolt head 120 via the angled collar 130 via welding, soldering (e.g., silver soldered), gluing, sonic-welding, etc. or any combination of attachment methods such that the deformable-bolt head component 150, the angled collar 130, and the main-bolt head 120 cannot rotate (e.g., about the central axis $X_c$ of the bolt 100) relative to one another. According to some implementations of the present disclosure, the main-bolt head 120, the angled collar 130, and the deformable-bolt head component 150 become an integral unit (e.g., once attached together) such that rotating the main-bolt head 120 (e.g., during installation of the bolt 100) causes a corresponding/identical rotation of the angled collar 130 and the deformable-bolt head component 150.

Generally, during installation of the bolt 100 in conjunction with the nut 200 and the objects 300a, 300b, the amount of the relief space 180 is reduced. As best shown in the pre-installation (e.g., pre-torqueing of the bolt 100 that causes deformation of the deformable-bolt head component 150) configuration in FIGS. 2A-2C and 3A-3B, a first portion of the deformable-bolt head component 150 is contained in the inwardly tapered recess 139 (FIGS. 1B and 1C) of the reinforced head 110. After installation of the bolt 100 in conjunction with the nut 200 and the objects 300a, 300b (FIGS. 3A-3D), a second portion of the deformable-bolt head component 150 is contained in the inwardly tapered recess 139 of the reinforced head 110, wherein the second portion of the deformable-bolt head component 150 has a larger volume than the first portion of the deformable-bolt head component 150. Similarly, due to the deformation of the deformable-bolt head component 150 during installation, the deformable-bolt head component 150 has a first shape (e.g., a flying saucer-type shape) prior to installation of the bolt 100 in conjunction with the nut 200 and the objects 300a, 300b and a different second shape (e.g., a flattened on one-side flying saucer-type shape, such as on the front face 172) after installation of the bolt 100 in conjunction with the nut 200 and the objects 300a, 300b.

Figure 3A:
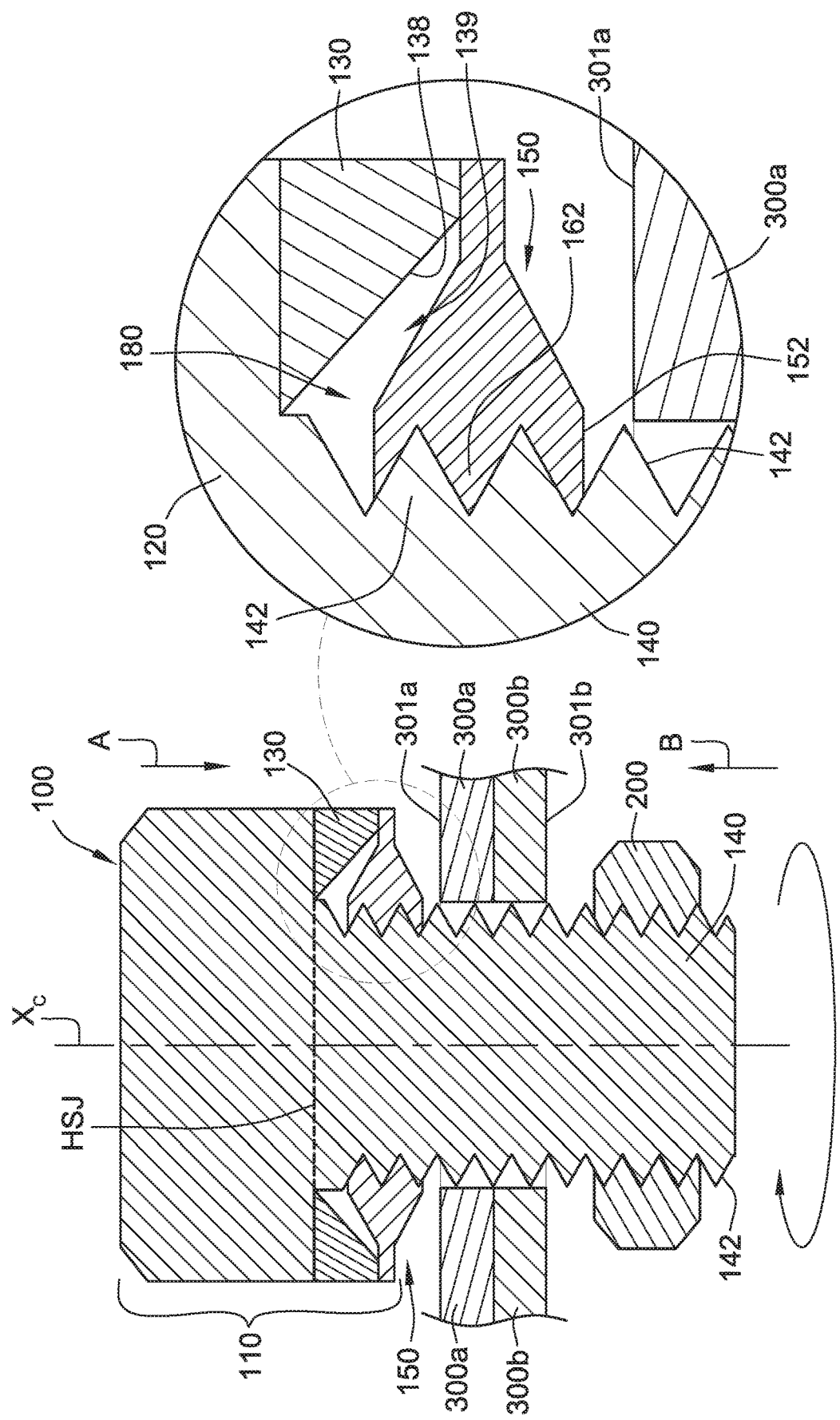
FIG. 3A is a front cross-sectional view of the bolt of FIG. 2A loosely positioned through an object and loosely threadingly engaged with a nut prior to the nut being torqued according to some implementations of the present disclosure.
Figure 3B:
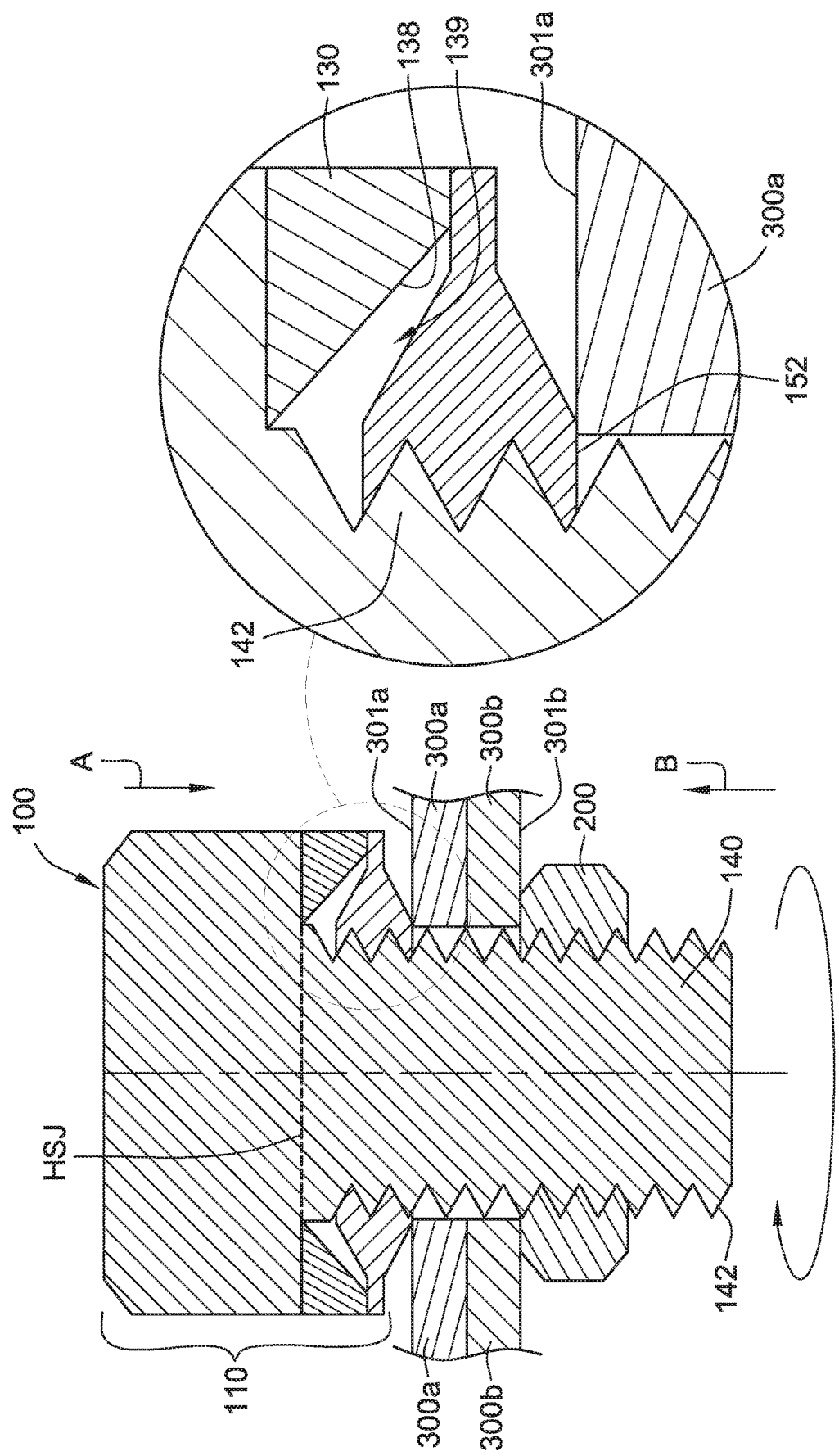
FIG. 3B is a front cross-sectional view of the bolt of FIG. 3A threadingly engaged with the nut such that the object is secured therebetween and prior to the nut being torqued according to some implementations of the present disclosure.

Now referring to FIGS. 3A-3D, a method of securing the bolt 100 with the nut 200 to the objects 300a, 300b is described. Initially, the threaded bolt shaft 140 is positioned through an opening in objects 300a, 300b such that a portion of the threaded bolt shaft 140 protrudes from the opening and such that the front surface 152 of the deformable-bolt head component 150 abuts a surface 301a of the object 300a (best shown in FIG. 3B). Then the nut 200 is threaded onto the portion of the threaded bolt shaft 140 protruding from the opening by rotating the nut 200 in a first rotational direction (as shown in FIGS. 3A-3D as being clockwise, but could be counterclockwise in other implementations). This rotation of the nut 200 causes the nut 200 to move axially in the direction of arrow B towards a surface 301b of the object 300b and towards the reinforced head 110 of the bolt 100. The nut 200 is continued to be rotated on the portion of the threaded bolt shaft 140 until a front surface of the nut 200 abuts and/or first contacts the surface 301b of the object 300b. As such, the front surface 152 of the deformable-bolt head component 150 abuts and/or is snug against the surface 301a of the object 300a and the nut 200 abuts and/or is snug against the surface 301b of the object 300b as shown in FIG. 3B (i.e., prior to torqueing).

Then rotational torque is applied to the bolt 100 and/or the nut 200 (e.g., using one or more tools and/or one or more torque wrenches). In some implementations, the reinforced head 110 of the bolt 100 is held generally stationary (e.g., via a tool) and a rotational torque is applied to the nut 200 in a rotational direction (e.g., clockwise), thereby torqueing the bolt/nut fastener. In some other implementations, the nut 200 is held generally stationary (e.g., via a tool) and a rotational torque is applied to the reinforced head 110 of the bolt 100 in a rotational direction (e.g., counterclockwise), thereby torqueing the bolt/nut fastener. In yet some other implementations, a first rotational torque is applied to the nut 200 in a first rotational direction (e.g., clockwise) and a second rotational torque is applied to the bolt 100 in a second rotational direction (e.g., counterclockwise), thereby torqueing the bolt/nut fastener.

The above described torqueing (e.g., of the bolt 100, of the nut 200, or both) causes the main-bolt head 120 to move axially in the direction of arrow A and further causes the deformable-bolt head component 150 to deform (e.g., the central body portion 155 deforms, the outer flange 170 deforms, or both). As the deformable-bolt head component 150 deforms, a portion of the deformable-bolt head component 150 (e.g., a portion of the central body portion 155, a portion of the outer flange 170, or a combination thereof) enters into the relief space 180 formed between the deformable-bolt head component 150, the angled collar 130, and the main-bolt head 120.

Figure 3C:
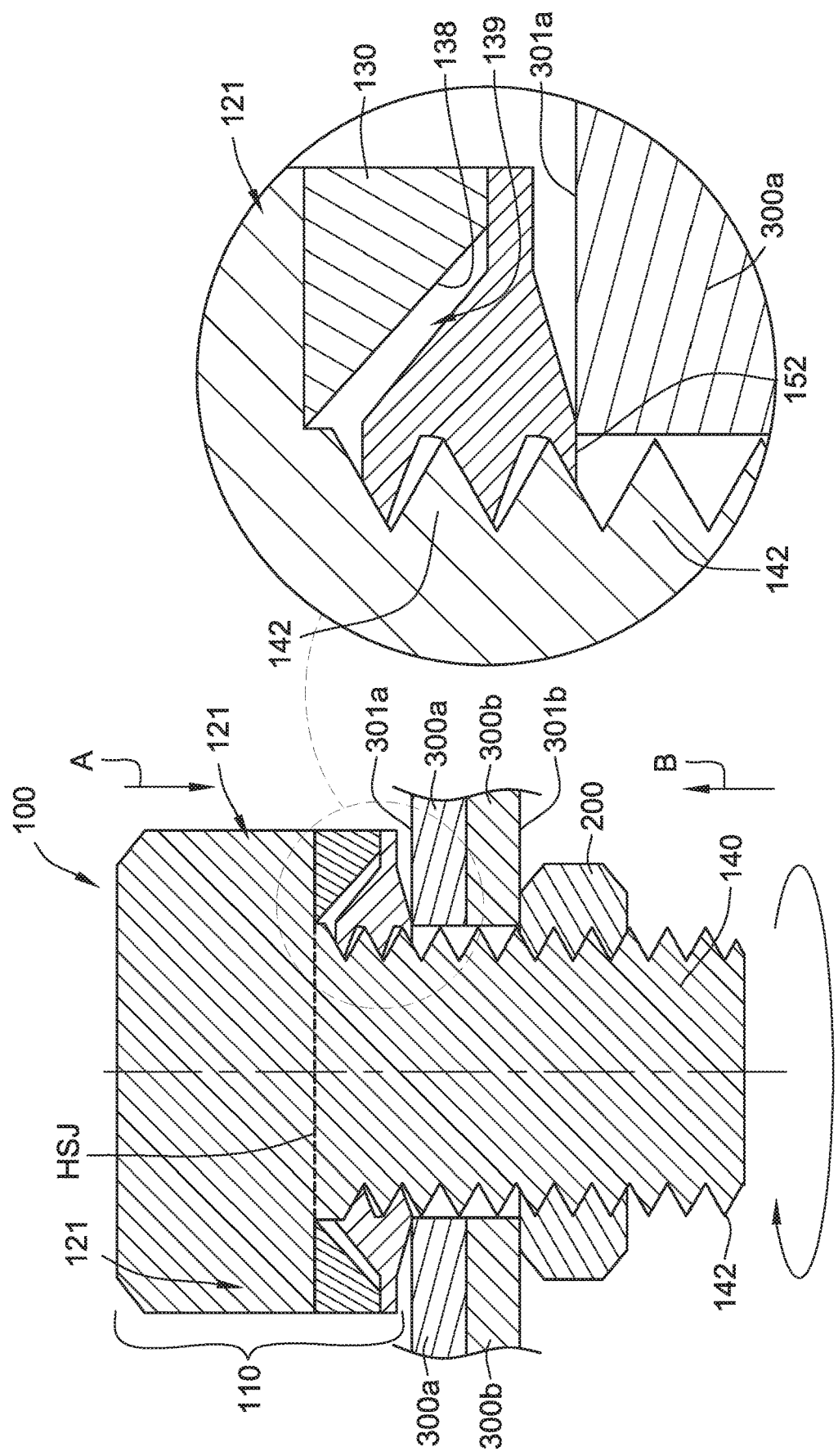
FIG. 3C is a front cross-sectional view of the bolt of FIG. 3A threadingly engaged with the nut after the nut is partially torqued such that a deformable-bolt head component of the bolt begins to deform.
Figure 3D:
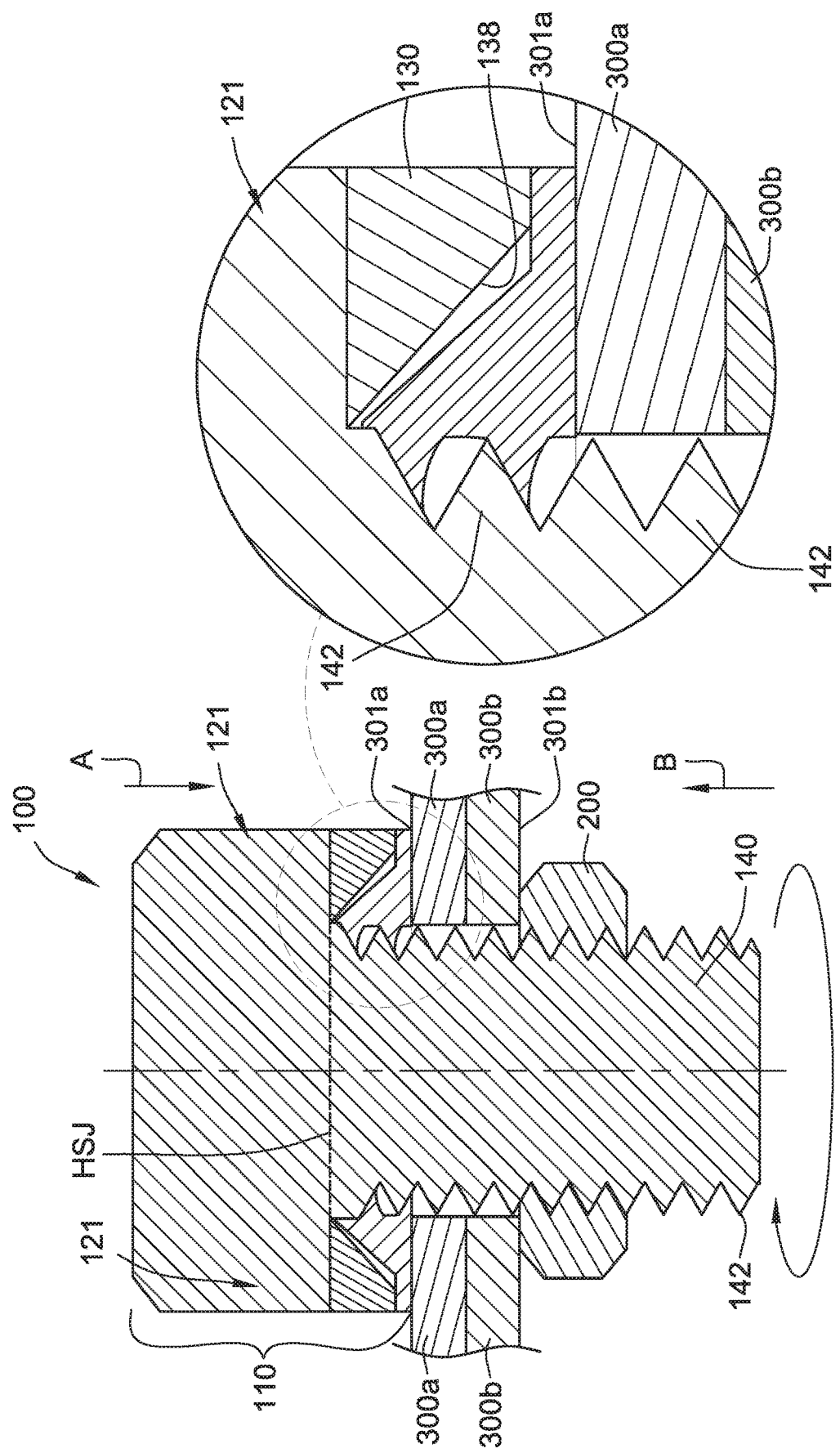
FIG. 3D is a front cross-sectional view of the bolt of FIG. 3A threadingly engaged with the nut after the nut is fully torqued such that the deformable-bolt head component of the bolt is further deformed.

As shown by a comparison of FIGS. 3B and 3C, the deformable-bolt head component 150 has started to deform and enter into the relief space 180. Further, as shown by a comparison of FIGS. 3C and 3D, the deformable-bolt head component 150 deformed even more with more of the deformable-bolt head component 150 entered into the relief space 180. In addition to the deformable-bolt head component 150 entering into the relief space 180, the surface 301a impedes and/or prevents the deformable-bolt head component 150 from moving in the direction of arrow A, which results in the front surface 152 and/or the inclined front face 172 flattening out, which can be seen by comparing FIG. 3B (prior to torqueing and not flattened) with FIG. 3D (after torqueing and flattened). More specifically, in some implementations, the inclined front face 172 flattens out, which changes angle $\alpha$ from about one hundred and fifty degrees to about one hundred and eighty degrees (e.g., essentially flat/co-planar with the outer flange 170 and/or horizontal).

Generally, when the bolt 100 is installed, the deformable-bolt head component 150 locks and compresses into the inwardly tapered recess 139, thereby (i) reinforcing and strengthening the coupling between the threaded shaft 140 and the reinforced head 110 and (ii) redirecting torsional and pressure forces to the main-bolt head 120 for a wider load distribution. Specifically, the deformation of the deformable-bolt head component 150 (e.g., the deformation of the central body portion 155) during the torqueing causes the deformable-bolt head component 150 to aid in redistributing preload forces away from the head-shaft joint HSJ and towards (i) an outer portion 121 (e.g., the portion of the main-bolt head 120 that overhangs the threaded shaft 140 and/or the portion that corresponds with the thickness of the angled collar 130) of the main-bolt head 120 and (ii) a portion of the external thread 142 of the threaded shaft 140. Specifically, as best shown in the enlarged portions of FIGS. 3C and 3D, the surface 301a of the object 300a imparts a force on the front surface 152 of the deformable-bolt head component 150 (e.g., due to the preload force caused by the torqueing of the bolt 100 and the nut 200). This imparted force (e.g., preload force) is redirected from the head-shaft joint HSJ transmitted to (1) the outer portion 121 of the main-bolt head 120 via the flange 170 of the deformable-bolt head component 150 and via the angled collar 130 and (2) the portion of the external thread 142 of the threaded shaft 140 via the internal thread 162 of the deformable-bolt head component 150.

The bolt of the present disclosure performs better than a standard bolt (i.e., a bolt without a deformable-bolt head component as described herein). Specifically, a bolt incorporating the deformable-bolt head component can be torqued, without shearing or popping off its head, to a relatively higher value as compared to a standard bolt without the deformable-bolt head component. For example, in some such implementations, the bolt 100 of the present disclosure can be torqued at least about twenty-five percent more as compared with a standard bolt having a similar nominal size. In some other implementations, the bolt 100 of the present disclosure can be torqued at least about fifty percent more as compared with a standard bolt having a similar nominal size. In some other implementations, the bolt 100 of the present disclosure can be torqued at least about one hundred percent more (i.e., twice the torque) as compared with a standard bolt having a similar nominal size. Such a relatively higher torque results in a correspondingly higher maximum applied clamp load of the bolt as compared with a standard bolt.

It is to be understood that many modifications and variations may be devised given the above description of the general principles of the present disclosure. It is intended that all such modifications and variations be considered as within the spirit and scope of the present disclosure, as defined in the following claims.

What is claimed is:

1. A method of making a bolt, the method comprising:
    providing a main-bolt head with a threaded shaft extending therefrom, the main-bolt head having a recess;
    providing a deformable-bolt head component having an outer flange and an interior threaded bore; and
    threading the deformable-bolt head component onto the threaded shaft (i) such that a portion of the deformable-bolt head component is positioned within the recess of the main-bolt head and (ii) until the outer flange engages a front surface of the main-bolt head, thereby forming a relief space between the deformable-bolt head component and the recess.

2. The method of claim 1, further comprising fixing the outer flange of the deformable-bolt head component to the main-bolt head such that the outer flange is prevented from rotating relative to the main-bolt head and the threaded shaft.

3. The method of claim 1, wherein the recess is an inwardly tapered recess that is annular and at an angle relative to a central axis of the bolt between about 30 degrees and about 75 degrees.

4. The method of claim 1, wherein the recess is an annular concave recess.

5. The method of claim 1, wherein the interior threaded bore of the deformable-bolt head component forms between about 0.5 and about 3.0 turns of an internal thread.

6. The method of claim 1, wherein the outer flange of the deformable-bolt head component has a first elastic modulus and the rest of the deformable-bolt head component has a second elastic modulus that is greater than the first elastic modulus.

7. A method of making a bolt having a reinforced head, the method comprising:
    providing a main-bolt head with a threaded shaft extending therefrom;
    positioning an angled collar about the threaded shaft such that the angled collar engages the main-bolt head, the angled collar having an angled inner surface;
    fixing the angled collar to the main-bolt head, thereby forming a recess of the reinforced head; and
    threading a deformable-bolt head component onto the threaded shaft (i) such that a portion of the deformable-bolt head component is positioned within the recess of the reinforced head and (ii) until an outer flange of the deformable-bolt head component engages a front surface of the angled collar, thereby forming a relief space between the deformable-bolt head component and the recess.

8. The method of claim 7, further comprising fixing the outer flange of the deformable-bolt head component to the main-bolt head via the angled collar.

9. The method of claim 8, wherein the fixing prevents the outer flange from rotating relative to: the main-bolt head, the angled collar, and the threaded shaft.

10. The method of claim 7, wherein the outer flange of the deformable-bolt head component has a first elastic modulus and the rest of the deformable-bolt head component has a second elastic modulus that is greater than the first elastic modulus.

* * * * *